ALBERT C. BETTS.
Improvement in Fences.
No. 124,477. Patented March 12, 1872.
Fig. 1. Fig. 2.
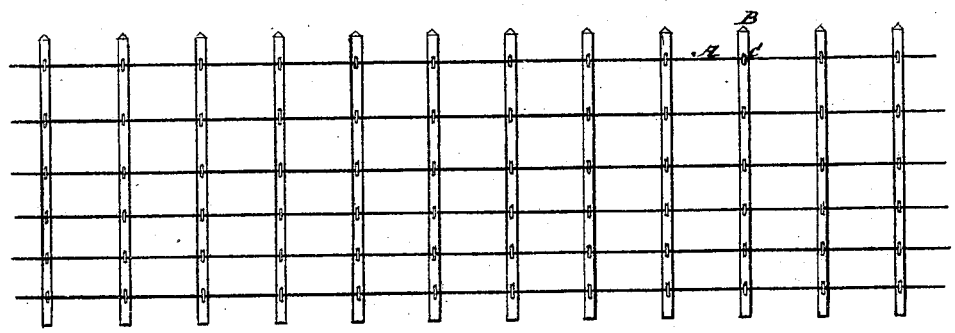 
Fig. 3.
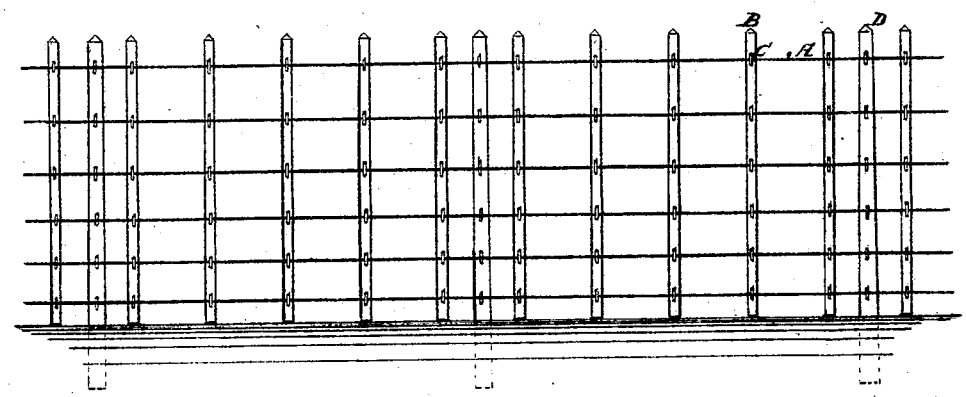
Fig. 4.
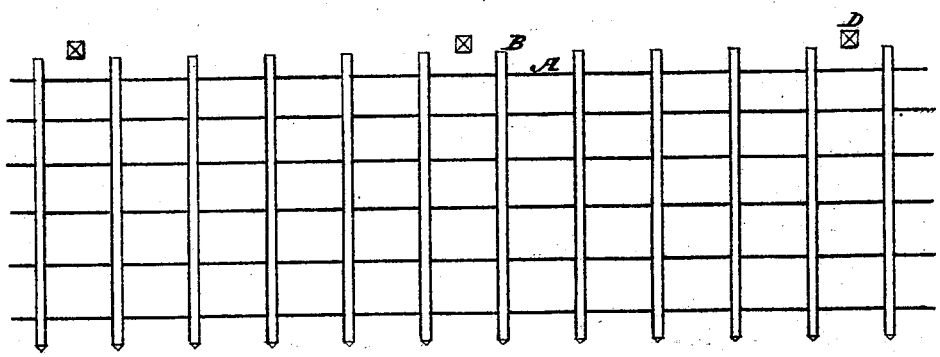
Witnesses:
E. Wolff
Geo. W. Mabee
Inventor:
A. E. Betts
per Munn & Co.
Attorneys.

UNITED STATES PATENT OFFICE.

ALBERT C. BETTS, OF TROY, NEW YORK.

IMPROVEMENT IN FENCES.

Specification forming part of Letters Patent No. 124,477, dated March 12, 1872.

Specification describing a certain Improved Portable Wire Fence, invented by ALBERT C. BETTS, of Troy, in the county of Rensselaer and State of New York.

My invention consists of a portable wire fence formed of longitudinal parallel lines and vertical pickets, the wires being fastened to the pickets by staples, and the pickets being placed at such distances apart as to prevent the wires from being forced apart by animals so as to pass through, and not so near as to interfere with rolling the structure thus formed up into a roll for convenience in carrying it from the factory or shop to the place where it is to be set up, or for removing it from place to place.

The wires and pickets thus arranged and connected are made in sections of greater or lesser lengths, according to convenience in handling, and secured in position in the field by erecting the pickets upon the ground and fastening the wires or pivots to posts set permanently in the ground, a rod apart or thereabout, the said wires being secured by staples, which may be readily pulled out again to release the wires and pickets when the fence is to be removed.

Figure 1 is a front elevation of the wires and pickets secured together according to my invention. Fig. 2 is an end elevation of the same. Fig. 3 is a front elevation of the completed fence, the said wires and pickets being secured to the posts planted in the ground; and Fig. 4 is a plan view of the line of posts, and the wires and pickets lying upon the ground ready for being erected to fasten the posts, showing the simple and convenient manner in which the roll may be first unrolled upon the ground along the posts and then lifted upon the ends of the pickets for fastening; and, in case of taking the wires and pickets down for removal, they will be unfastened from the posts, laid down, and rolled up into a bundle, which may be handled readily.

A represents the longitudinal parallel wires; B, the pickets; and C, the staples with which they are fastened together. Said wires will be in long sections of several rods, and the pickets will be from one to two feet apart, more or less. The length of the sections will be determined mainly by the size of the bundle they make when rolled up, and the wires will be spliced in the ordinary way. D represents the posts, planted in the ground, say, from one to two rods apart, for holding the fence erect.

I propose to secure the wires to the pickets by machinery adapted to secure all the wires to one picket at once, the wires, pickets, and staples being fed or supplied to the machine in regular course, and thus provide this part of the fence for market at a very cheap rate, so that the only labor required in the field will be the setting of the posts and securing the said wires and pickets thereto. Stakes driven in the ground will answer well for the posts, for the weight of the wires and pickets is not such as to require great strength.

I am aware that the wires and pickets have been put together in portable form to be secured to posts set in the ground by weaving them together; also, that the wires have been strung along posts or pickets set in the ground close together and secured to them by staples; and I do not claim either of these arrangements.

Having thus described my invention, I claim as new and desire to secure by Letters Patent—

As a new article of manufacture, the longitudinal parallel wires and the pickets perpendicular thereto, connected together by the staples, and made in long sections for the construction of wire fence by fastening to posts and splicing the wires of the sections, all substantially as specified.

The above specification of my invention signed by me this 1st day of November, 1871.

ALBERT C. BETTS.

Witnesses:
GEO. W. MABEE,
T. B. MOSHER.